United States Patent [19]

Reinhold

[11] Patent Number: 4,749,273
[45] Date of Patent: Jun. 7, 1988

[54] METHOD AND APPARATUS FOR DETERMINING THE MATERIAL FLOW RATE OF CONVEYING MECHANISMS

[75] Inventor: Bodo Reinhold, Essen, Fed. Rep. of Germany

[73] Assignee: Fried. Krupp Gesellschaft mit beschränkter Haftung, Essen, Fed. Rep. of Germany

[21] Appl. No.: 781,113

[22] Filed: Sep. 27, 1985

[51] Int. Cl.[4] .................. G01C 3/08; G01B 11/24; G01B 11/28; G01F 1/00
[52] U.S. Cl. ............................. 356/5; 356/4; 356/376; 356/379; 73/861
[58] Field of Search ............ 356/28, 5, 4, 3, 376, 356/377, 379, 380; 73/861, 861.02, 861.05, 861.06

[56] References Cited

U.S. PATENT DOCUMENTS

| | | | |
|---|---|---|---|
| 3,508,066 | 4/1970 | Agar | 356/28 |
| 3,804,517 | 4/1974 | Meyr et al. | 356/28 |
| 3,804,518 | 4/1974 | Meyr | 356/28 |
| 3,865,487 | 2/1975 | Andermo | 356/28 |
| 3,900,262 | 8/1975 | Baxter | 356/28 |
| 4,312,592 | 1/1982 | Sabater et al. | 356/28 |
| 4,329,047 | 5/1982 | Kikuchi et al. | 356/28 |
| 4,344,705 | 8/1982 | Kompa et al. | 356/5 |
| 4,521,107 | 6/1985 | Chaborski et al. | 356/5 |
| 4,527,894 | 7/1985 | Goede et al. | 356/5 |
| 4,553,836 | 11/1985 | Meier et al. | 356/5 |
| 4,583,857 | 4/1986 | Grammerstorff | 356/1 |
| 4,674,869 | 6/1987 | Pryor et al. | 356/376 |

Primary Examiner—Stephen C. Buczinski
Assistant Examiner—Melissa L. Koltak
Attorney, Agent, or Firm—Becker & Becker, Inc.

[57] ABSTRACT

A method and apparatus for determining the material flow rate of bulk material, transported by belt conveyers or the like, by continuously determining the contour of the free surface of the bulk material, at right angles to the direction of transport, via continuous non-contact distant measurement using transmitter-receiver mechanisms coupled with a computer, and by computing the cross section of the bulk material. A precise and reliable measurement of the height of bulk material on the conveyer belt is achieved by using, as the transmitter-receiver mechanisms, respective laser distance-measuring devices which emit and receive a reflecting laser beam. These devices preferably operate pursuant to the pulse transit time measuring principle. The laser distance-measuring devices are accommodated in a housing.

9 Claims, 3 Drawing Sheets

METHOD AND APPARATUS FOR DETERMINING THE MATERIAL FLOW RATE OF CONVEYING MECHANISMS

BACKGROUND OF THE INVENTION

1. Field of the Invention

The present invention relates to a method and appratus for determining the material flow rate of bulk material, transported by belt conveyers or the like, by continuously determining the contours of the free surface of the bulk material, at right angles to the direction of transport, by means of continuous non-contact distance measurement using at least one transmitter-receiver mechanism coupled with a computer, and by computing the bulk material cross section.

2. Description of the Prior Art

It is already known to measure the flow of bulk materials transported by belt conveyers by determining the contours of the free surface of the bulk material using a photographic camera or a television camera, or by ultrasonic distance measurement. Taking into consideration the known profile, which is determined at the measuring point by the set of supporting idler rollers and the conveyer belt, the bulk material cross section is then determined at relatively short intervals and is multiplied by the transport speed to yield the volumetric flow, i.e. the volume transported per unit of time. The flow rate is found by multiplying the density of the bulk material. To simplify matters, both volumetric flow and material flow will be designated here summarily as material flow rate.

In a method of the type described above, where the continuous distance measurement is carried out without any physical contact with the assistance of at least one transmitter-receiver mechanism, the latter consists of an ultrasonic distance-measuring device. However, this known method suffers from the drawback that it is necessary to install the ultrasonic distance-measuring device in close proximity to the bulk material surface, so that the sound impact footprint surface area, which is formed by the so-called sound lobe (beam), is not too large; so that the reflected sound pulse still has sufficient energy to provide an unequivocal value (reading), this being particularly applicable to materials with poor reflectivity; and so that air streams which will cause disturbances can be positively screened off. The installation of the measuring devices in the vicinity of the surface of the bulk materials can, however, easily lead to the destruction of the distance-measuring devices, particularly in the area of transfer points. Even if the measuring devices are installed relatively close to the surface of the bulk material, measuring errors frequently result because of various influences, particularly in the case of higher transporting velocities.

It is an object of the present invention to provide a method, and an apparatus for the implementation of the method, which will make it possible to achieve accurate measured values even in the case of greater measuring distances and at the same time in the case of greater transporting velocities.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
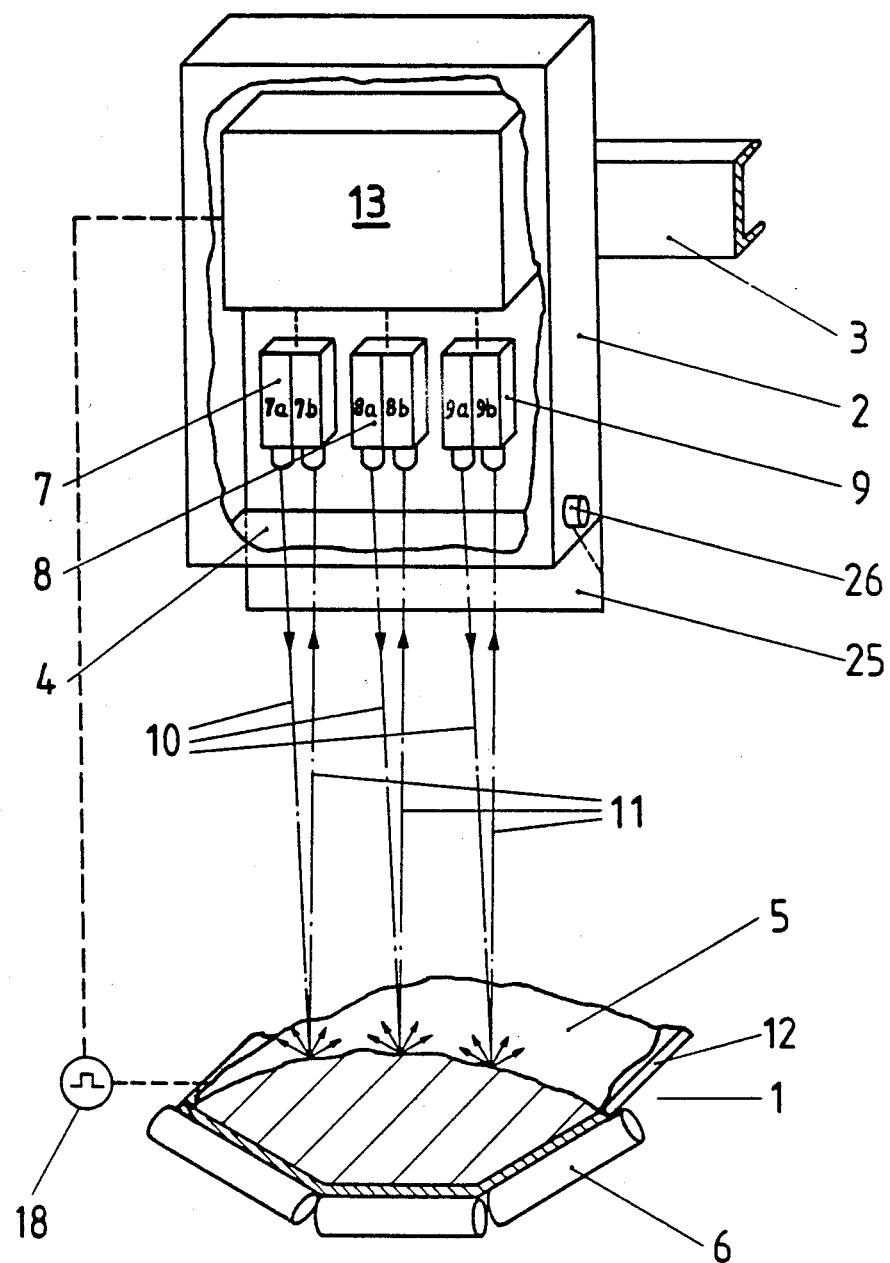
FIG. 1 shows in an elevational view one inventive embodiment of the apparatus for implementing the inventive method, the apparatus being installed above a conveyer belt.

The method of the present invention is characterized primarily in that the transmitter-receiver mechanism comprises a laser distance-measuring device which emits and receives a reflecting laser beam.

The apparatus of the present invention is characterized primarily in that the distance-measuring devices are installed side-by-side within a housing in a plane perpendicular to the direction of transport of the belt conveyer, and in that this housing is provided at its bottom side, facing toward the conveyer belt, a transparent (glass) pane which may be blocked off by an adjustable flap. The housing may accommodate the computer and any other appropriate devices.

In addition to avoiding the aforementioned drawbacks of ultrasonic measuring technology, the present invention introduces the further advantage that the frequency of the individual measurements is increased by a large factor. Thus, even in the case of high transporting velocities, it will be possible to measure values of bulk material cross sections spaced only a few centimeters apart in the direction of travel of the conveyer belt. A further advantage is the ability to distribute a far greater number of distance-measuring devices over the cross section of the bulk material; thus, more accurate measurements are obtained. Finally, the small diameter of the transmitter beam makes it possible to measure very jagged and severely agitated surfaces with a fine resolution.

Pursuant to advantageous implementations of the inventive method, the beam or beams travel approximately at right angles to the direction of transport of the material.

The laser distance-measuring devices may operate using the pulse transit time measuring principle.

From two to seven laser distance-measuring devices may be used, with one of several measuring points distributed over the bulk material cross section being allocated to any one of the laser distance-measuring devices. The latter may be installed in such a manner that their light beams are located substantially in a plane perpendicular to the direction of transport, and that their distance from the surface of the bulk material is anywhere from approximately 2 to 20 meters.

Alternatively, the laser distance-measuring devices may be installed in such a manner that their measuring points are offset relative to one another in the direction of transport, and the measured values may be synchronized in such a manner that the contour of the surface of the bulk material is always determined in a cross section perpendicular to the direction of transport.

The measured distance value or values may be recorded digitally, be fed into the subsequently connected computer, and be combined respectively with corresponding values of belt velocity recorded by a pulse transmitter connected to the conveyer belt; the calculated values of material flow rate may be indicated in an analog manner, and those of material quantity may be indicated digitally and are preferably stored. For an appropriate unit, the value of the bulk material flow rate may be used to form the setpoint value for a material quantity control system.

DESCRIPTION OF PREFERRED EMBODIMENTS

Referring now to the drawings in detail, FIG. 1 shows a box-shaped, closed housing 2 mounted above a conveyer belt 1 on a fixed girder 3 in such a manner that the lower side of the housing, which is equipped with a transparent (e.g. glass) pane 4, is located approximately 6 meters above the surface 5 of the bulk material located on the conveyer belt 1, within the area of a garland idler roller set 6. Three laser distance-measuring devices 7, 8, and 9 are located within the housing 2; each of these devices comprises a transmitter section 7a, 8a, and 9a, and a receiver section 7b, 8b, and 9b. Each of the transmitter sections 7a, 8a, 9a contains a laser transmitter, and at its lower side, facing the bulk material, also contains a transmitter lens system. In a similar manner, each receiver section 7b, 8b, 9b contains a receiver and a receiver lens system. The laser distance-measuring devices 7, 8, and 9 are arranged side-by-side in such a manner that the light pulses emitted as light beams 10, and the light beams 11 reflected from the surface 5 of the bulk material and entering the corresponding receiver lens system, are each located side-by-side as close as possible; furthermore, the light beams 10 are parallel to one another, and are disposed in a plane which is perpendicular to the direction of transport. The central light beam emitted from the transmitter section 8a is furthermore disposed in the vertical plane of symmetry of the conveyer belt 1.

The laser distance-measuring devices that are used operate in accordance with the following known principle: The transmitters, which provided with semiconductors, generate infrared light pulses at a fixed pulse repetition rate. In the transmitter lens system, the light pulses are enlarged into a light bundle, the light beams 10 of which strike the surface 5 of the bulk material, where they are reflected in a diffused manner. Of these diffused reflected light beams, a fraction, namely the light beams 11, will strike the receiver lens systems of the receiver sections 7b, 8b, and 9b. The appropriately correlated transmitters and receivers are adjusted in such a manner that the emitted light beams 10 and the refected light beams 11 are of the same length. During the time period between emission and reception, the light pulse has to travel the path from the laser distance-measuring device to the surface of the bulk material, and back again. This time is recorded, and is converted in the evaluation electronics of the laser distance-measuring device into a value for the distance by halving the time and then dividing it by the speed of light. The value for the distance is recorded in digital form.

Figure 2:
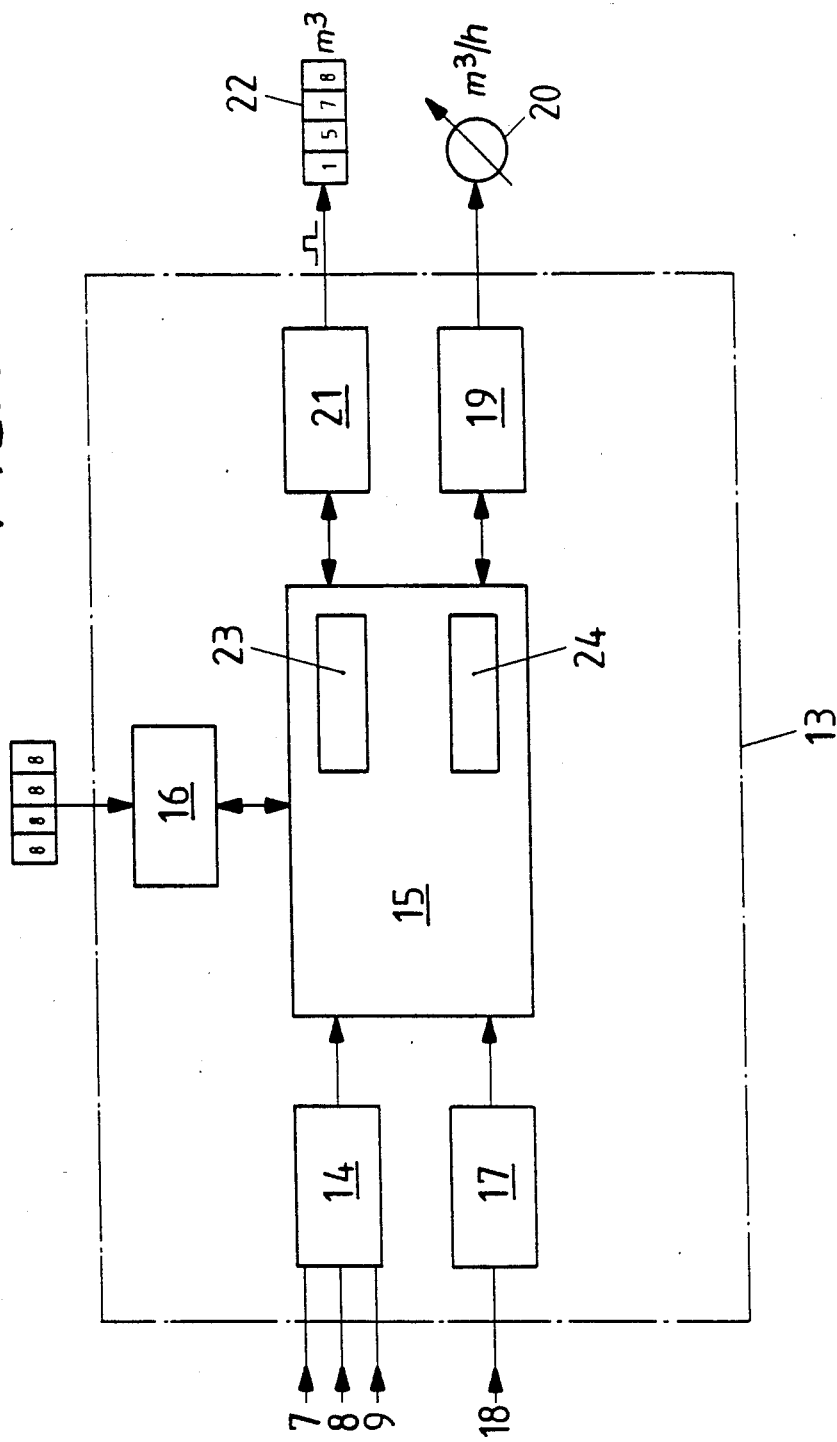
FIG. 2 shows a system block diagram of the computer used.

The digital values of the distance, determined in conformity with the pulse sequence, are respectively fed by the laser distance-measuring devices into the appropriate input or data acquisition portion 14 of a computer 13, which is a so-called micro-processor (FIG. 2). From there, these values are fed into the processor unit 15, which is provided, via a parameter input 16, with data relating specifically to the conveyer belt, such as the belt width, the depth of the trough (formed by the belt), the distance of the measuring device from the belt, and the location of the measuring points, i.e. the impact points of the light pulses on the surface of the bulk material. In addition, pulses are fed into the processor unit 15 by a pulse counter assembly 17. These pulses are registered by a pulse sensor 18 coupled to the conveyer belt 1, and are used to calculate the conveyer belt velocity. The values of the distance measurement from the input unit 14 are linked with the values from the parameter input 16, and the cross section of the bulk material on the conveyer belt is then continuously calculated from this. The bulk material cross section multiplied by the conveyer belt velocity yields the volumetric flow. This is continuously indicated, via an analog value output 19, on a dial 20. A digital value output 21 feeds the value of the summated bulk material transport volume (which is also stored in a memory 23) to a counter 22. The evaluation program is fed into a memory 24. The volumetric flow is utilized as a setpoint or actual value for a transported materials quantity control system which is provided for the conveyer belt system.

The underside of the housing 2, which is closed off by the transparent pane 4, may be blocked off in a light-tight manner by a flap 25. The closure is carried out automatically by a solenoid switch 26 whenever the laser distance-measuring devices are switched off. This automatic system is switched off when the flap 25 is used to calibrate the laser distance-measuring devices. The transparent pane 4 is made from a suitable special glass.

Figure 3:
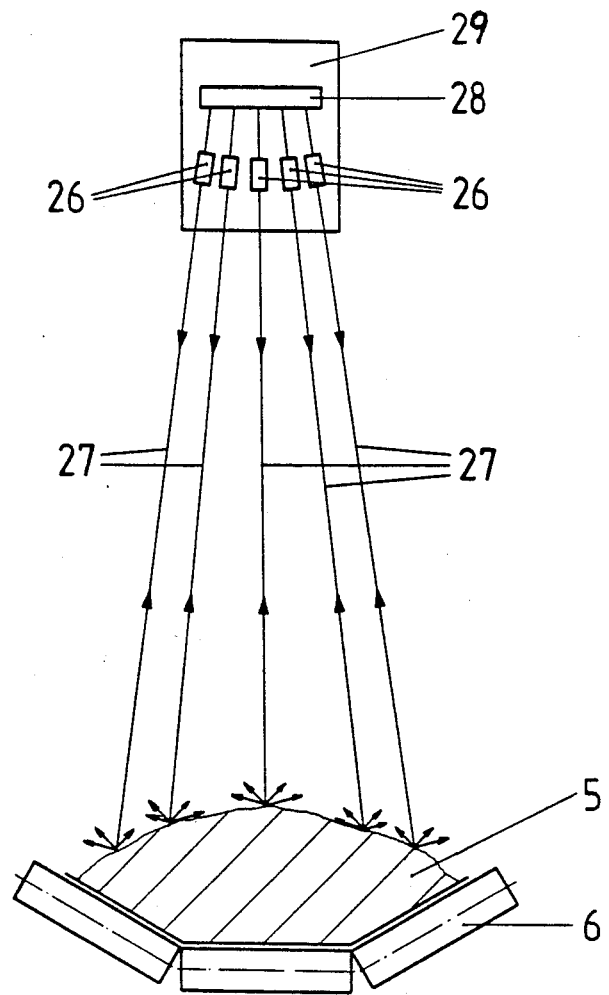
FIG. 3 is a cross sectional view of another inventive embodiment of the apparatus for implementing the method of the present invention.

In the embodiment illustrated in FIG. 3, five laser distance-measuring devices 26 are provided; these devices are constructed as interferometers having a light beam reflecting into itself. The devices are installed in a housing 29 in such a manner that their light beams 27 diverge as they come from the housing, and are disposed in a plane perpendicular to the direction of transport. The values obtained by the laser distance-measuring devices 26 are fed in a manner similar to that described in connection with the previous embodiment into a computer 28, where they are processed. This arrangement with divergent light beams allows a closer spacing of the laser distance-measuring devices, and thus permits the housing which accommodates them to be more compact. It is, however, also possible to install the laser distance-measuring devices in a staggered arrangement in the direction of transport. The same applies to the measuring points on the surface 5 of the bulk material. In this case, where the measuring points are not all located in a plane perpendicular to the direction of transport, the correlation to a cross section value can be readily achieved by means of a time correction.

The number of laser distance-measuring devices to be utilized in measuring the cross sectional area depends on the width of the conveyer belt. Regardless of the belt widths, by using a larger number of devices, the bulk material cross section can be determined with a greater degree of accuracy. As a rule however, three to five laser distance-measuring devices will suffice. The novel method is particularly advantageous for use on large units, such as on bucket-wheel excavators or the like.

The present invention is, of course, in no way restricted to the specific disclosure of the specification and drawings, but also encompasses any modifications within the scope of the appended claims.

What I claimed is:

1. A method of determining the material volumetric flow rate of bulk material transported by a conveyer mechanism of which speed is measured by impulse counters, said method including continuously determining the contour of the free surface of the bulk material, at right angles to the direction of transport, by means of continuous non-contact distance measurement using at least one transmitter-receiver mechanism coupled with a computer, and computing the cross section per unit time of the bulk material; said method comprising the steps of:

using as said transmitter-receiver mechanism at least two laser distance-measuring devices connected side by side for determination of irregular surface contour of the bulk material being conveyed which operate exclusively for distance measuring by using a pulse transit time measuring principle and which emit and receive reflecting laser beams for such distance measuring; directing said laser beams approximately at right angles to the direction of transport of said bulk mateiral having a cross section on said conveyor mechanism; and distributing several measuring points over the bulk material cross section and thus continuously ascertaining irregular surface contour of the bulk material transported by the conveyor mechanism in order to determine volumetric flow rate of the bulk material cross section collectively on the conveyor mechanism transverse to direction of movement thereof.

2. A method in combination according to claim 1, which includes the steps of: providing two to seven of said laser distance-measuring devices; and allocating a given one of said measuring points to a given one of said laser distance-measuring devices 3. A method in combination according to claim 2, in which said laser distance-measuring devices are disposed in such a way that their laser beams are essentially located in a plane which extends at right angles to the direction of transport, with the distance of said laser distance-measuring devices from said surface of said bulk material being in the range of from about 2 to 20 meters.

4. A method in combination according to claim 2, in which said laser distance-measuring devices are disposed in such a way that their measuring points are offset relative to one another in the direction of transport, with the measured values being synchronized in such a way that the contour of said surface of said bulk material is always determined in a cross section extending perpendicular to the direction of transport.

5. A method in combination according to claim 1, which includes the steps of: recording measured distance values digitally, feeding these values into the subsequently connected computer, respectively combining these values with corresponding values of conveyer mechanism velocity recorded by a pulse transmitter connected to said conveyer mechanism, indicating calculated values of material flow rate in an analog manner, and indicating calculated values of material quantity in a digital manner.

6. A method in combination according to claim 5, which includes the step of storing said calculated values.

7. A method in combination according to claim 5, which includes the step of using the value of the bulk material flow rate to form the setpoint value for a material quantity control system.

8. an apparatus for determining the material volumetric flow rate of bulk material transported by a conveyor mechanism by continuously determining the contour of the free surface of the bulk material, at right angles to the direction of transport, by means of continuous non-contact distance measurement using at least one transmitter-receiver mechanism including at least two laser distance-measuring devices which operate exclusively for distance measurement via a pulse transit time measuring principle, which are coupled with a computer, and which are employed to determine the bulk material volumetric flow rate by computing the cross section per unit time of the bulk material; said apparatus in combination comprising:

a housing for said transmitter-receiver mechanism including said at least two laser distance-measuring device; said housing having a bottom side, facing said conveyor mechanism, said bottom side including a transparent pane; and an adjustable flap for blocking said transparent pane; said at least two laser distance-measuring devices being disposed side by side next to one another in said housing in a plane which extends at right angles to the direction of transport of said conveyer mechanism for determination of irregular surface contours of the bulk material being conveyed; said laser distance-measuring devices being operative to emit and receive reflecting laser beams through said transparent pane for such distance measurement continuously to ascertain irregular surface contour of the bulk material transported by the conveyer mechanism in order to determine volumetric flow rate of the material on the conveyor mechanism transverse to direction of movement thereof.

9. An apparatus in combination according to claim 8, in which said computer is accommodated in said housing.

* * * * *